United States Patent
Dawson

(10) Patent No.: US 8,245,562 B2
(45) Date of Patent: Aug. 21, 2012

(54) CIRCUIT AND METHOD FOR PRESSURE SENSOR TESTING

(75) Inventor: Chad S. Dawson, Queen Creek, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 532 days.

(21) Appl. No.: 12/533,644

(22) Filed: Jul. 31, 2009

(65) Prior Publication Data

US 2011/0023577 A1   Feb. 3, 2011

(51) Int. Cl.
*G01L 27/00* (2006.01)
(52) U.S. Cl. .......................... 73/1.61; 702/116
(58) Field of Classification Search ............. 73/1.61; 702/88, 98, 116
See application file for complete search history.

(56) References Cited

U.S. PATENT DOCUMENTS

| | | | | |
|---|---|---|---|---|
| 3,092,965 A * | 6/1963 | Pearlman et al. | ............ | 60/39.26 |
| 4,081,988 A * | 4/1978 | Change et al. | ............ | 73/1.63 |
| 4,322,977 A * | 4/1982 | Sell et al. | ............ | 73/701 |
| 4,535,740 A * | 8/1985 | Ma | ............ | 123/435 |
| 4,570,490 A * | 2/1986 | Antonazzi | ............ | 73/701 |
| 4,703,650 A * | 11/1987 | Dosjoub et al. | ............ | 73/146.5 |
| 4,876,892 A * | 10/1989 | Arabia et al. | ............ | 73/718 |
| 5,026,255 A * | 6/1991 | Carpenter et al. | ............ | 417/5 |
| 5,187,985 A * | 2/1993 | Nelson | ............ | 73/708 |
| 5,406,952 A * | 4/1995 | Barnes et al. | ............ | 600/485 |
| 6,295,875 B1 * | 10/2001 | Frick et al. | ............ | 73/718 |
| 6,315,710 B1 * | 11/2001 | Bushek et al. | ............ | 600/25 |
| 7,152,474 B2 | 12/2006 | Deb et al. | | |
| 7,340,956 B2 | 3/2008 | Deb et al. | | |
| 2010/0246869 A1 * | 9/2010 | Zhang et al. | ............ | 381/320 |

* cited by examiner

*Primary Examiner* — Thomas P Noland
(74) *Attorney, Agent, or Firm* — Joanna G. Chiu; James L. Clingan

(57) ABSTRACT

A method for testing a pressure sensor having a first node and a second node includes coupling the first node to a first input of an amplifier and coupling a reference voltage to a second input of the amplifier; applying a transfer function to an output of the amplifier to provide a first output voltage that is based on a difference in voltage between the first node and the reference voltage; coupling the reference voltage to the first input and coupling the second node to the second input; obtaining a second output voltage at the output of the amplifier; and determining, based on the first and second output voltages, whether the pressure sensor passed or failed. During normal operation, the first node is coupled to the first input and the second node to the second input, and a second transfer function is applied to the output of the amplifier.

10 Claims, 1 Drawing Sheet

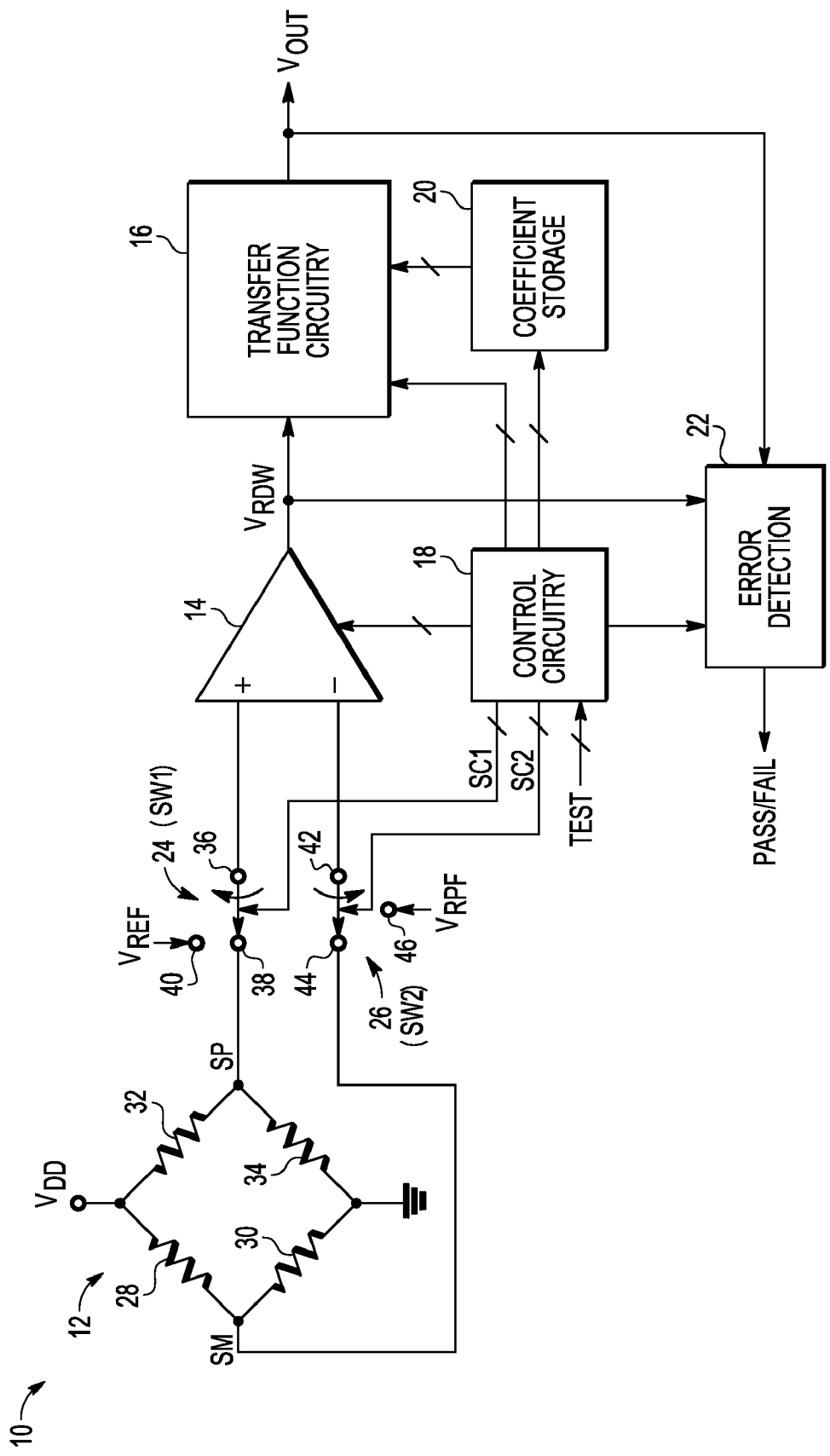

CIRCUIT AND METHOD FOR PRESSURE SENSOR TESTING

BACKGROUND

1. Field

This disclosure relates generally to pressure sensors, and more specifically, to testing pressure sensors.

2. Related Art

Pressure sensors have a variety of uses in electronic control of mechanical operations and this has become particularly true in automotive applications. One application is engine control where pressures are critical in the operation of an engine. Manifold pressure, for example, is important in making determinations relating to control of the engine. One aspect of pressure sensors is that they can degrade due to mechanical and temperature stresses. Corrosion and electrical leakage can also occur. As a result of these stresses, individual sensing elements that make up a sensor may degrade causing a reduction in the effectiveness of the engine control. It is thus desirable to avoid these situations where possible. Important in any improvement is understanding the problem. In the case of sensors, this can be a problem because of the difficulty in identifying the sensor as being the problem, especially when the problem is one where the sensor is still operating but providing false information as to the pressure. Also a faulty sensor, when left unrepaired, can lead to more other problems which may be more serious.

BRIEF DESCRIPTION OF THE DRAWINGS

The present invention is illustrated by way of example and is not limited by the accompanying FIGURE, in which like references indicate similar elements. Elements in the FIGURE are illustrated for simplicity and clarity and have not necessarily been drawn to scale.

Shown in the sole FIGURE is a block diagram according to an embodiment.

DETAILED DESCRIPTION

A sensor has a pair of differential outputs that are used to determine a voltage that is representative of a pressure. A first transfer function is determined for the sensor to establish a relationship between the voltage and the pressure. A second transfer function of the same type but with different coefficients is determined between the differential outputs. Both the first and second transfer functions are stored. During normal operation the first transfer function is used to provide an output that identifies a specific pressure. During a test operation, the second transfer function is used in response to a first of the differential outputs to provide a prediction of the second differential output. The second differential output is measured and compared to the prediction. If the prediction and the second differential output are too different, then the sensor is considered to have failed the test. This provides a technique for isolating the failure, if any, to the sensor. This is better understood by reference to the drawings and the following specification.

Shown in the FIGURE is a pressure sensor system 10 comprising a pressure sensor 12, an amplifier 14, a transfer function circuit 16, a control circuit 18, a coefficient storage 20, an error detection circuit 22, a switch 24, and a switch 26. Sensor 12 comprises a sensing element 28, a sensing element 30, a sensing element 32, and a sensing element 34. Switch 24, also shown as switch SW1, has terminals 36, 38, and 40. Switch 26, also shown as switch SW2, has terminals 42, 44, and 46. Sensing elements 28, 30, 32, and 34 may be piezoelectric devices that change resistance with change in pressure.

Sensing element 28 has a first terminal coupled to a positive power supply terminal shown as VDD and a second terminal coupled to a node SM which is coupled to terminal 44 of switch 26. Sensing element 30 has a first terminal coupled to node SM, and a second terminal coupled to a negative power supply terminal which in this example is ground. Sensing element 32 has a first terminal coupled to VDD and a second terminal coupled to a node SP which is coupled to terminal 38 of switch 24. Sensing element 34 has a first terminal coupled to node SP and a second terminal coupled to ground. Amplifier 14 has a inverting input coupled to terminal 42 of switch 26, a non-inverting input coupled to terminal 36 of switch 24, and an output for providing an output Vraw. Transfer function circuit 16 has a data input coupled to the output of amplifier 14 and an output for providing output signal Vout. Control circuit 18 has an input for receiving a test signal which may be provided by a processor not shown in the FIGURE, a first output coupled an input of coefficient storage 20, a second output coupled to a control input of amplifier 14, a third output for providing a switch control signal SW1 to a control input of switch 24, a fourth output for providing a switch control signal SW2 to a control input of switch 26, and a fifth output coupled to a control input of error detection circuit 22. Coefficient storage 20 has an output coupled to a coefficient input of transfer function 16. Error detection circuit 22 has a first signal input coupled to the output of transfer function circuitry 16, a second signal input coupled to the output of amplifier 14, and an output for providing a pass/fail signal. Terminal 38 of switch 24 is coupled to a reference voltage Vref. Terminal 46 of switch 26 is coupled to reference voltage Vref.

As is conventional, pressure sensor 12 is coupled as a Wheatstone bridge so that a differential is established between the voltage at node SM and the voltage at SP to indicate pressure. A series of tests, which may be called pressure tests, are performed with regard to pressure sensor 12 to determine the relationship between pressure and Vraw including effects of temperature. Based on these tests a transfer function is determined and stored in coefficient storage 20. The form of the transfer function is well known so that only the coefficients need to be stored in coefficient storage 20. Transfer function circuitry 16 is designed according to the form of the transfer function so that only the coefficients are needed in order to perform the desired transfer function. The coefficients for normal operation may be called the normal coefficients. During normal operation switch 24 couples terminal 38 to terminal 36 so that the non-inverting input of amplifier 14 receives the voltage present at node SP and switch 26 couples terminal 44 to terminal 42 so that the inverting input of amplifier 14 receives the voltage present at node SM. Amplifier 14 amplifies the difference between the inverting and non-inverting outputs to provide Vraw. Transfer function circuitry 16 responds by adjusting the voltage Vraw according to the transfer function using the normal coefficients stored in coefficient storage 20 for normal operation.

In addition to determining the normal coefficients for the transfer function, test coefficients are determined during the process of obtaining the normal coefficients. In addition to mapping the correlation between the pressure and Vraw in order to determine the normal coefficients, a correlation between the voltage at node SP is correlated to the voltage at node SM. This correlation has a transfer function of the same type as for normal operation so that only the coefficients are different. These test coefficients are determined with minimal additional test time during the time that the normal coefficients are determined. The changes in pressure are much more time consuming than the calculations and other circuit operations. Thus in addition to storing the normal coefficients after performing the pressure tests, the test coefficients are also stored in coefficient storage 20.

A test is initiated by a TEST command provided to control circuitry 18 by a processor not shown. In response control circuitry 18 directs switch 24 to couple terminal 38, which is the same as for normal operation, to terminal 36 and switch 26 to couple terminal 42 to terminal 46. Thus node SP is coupled to the non-inverting input and Vref is coupled to the inverting input. Control circuitry 18 directs amplifier 14 to provide Vraw as the amplified difference between the voltage at node SP and Vref. Vref may be conveniently ½ the voltage at VDD. Control circuitry 18 also directs the transfer of the test coefficients into transfer function circuitry 16 and transfer function circuitry 16 to perform the transfer function on Vraw using the test coefficients. The result is that transfer function circuitry 16 provides, as Vout, the voltage at node SP having undergone amplification and a transfer function. The result of this amplification and transfer function is what is stored in error detection circuit 22. This stored value is what the voltage at node SM, as amplified by amplifier 14, should be if all of sensing elements 28, 30, 32, and 34 are functioning properly. The next step is to obtain the voltage at node SM, as amplified by amplifier 14, and compare it to what is stored in error detection 22. In order to achieve this, control circuitry 22 directs switch 26 to couple terminal 44 to terminal 42 and switch 24 to couple terminal 40 to terminal 36. The result is that the non-inverting input is coupled to Vref and the inverting input is coupled to node SM. Control circuitry 18 directs amplifier 14 to provide Vraw as the amplified difference between the voltage at node SM and Vref. Control circuitry 18 then directs error detection circuit 22 to compared the stored value to Vraw. If these two values are sufficiently close, then error detection circuit provides an output indicating a pass. On the other hand, If these two values are too far apart, then error detection circuit 22 provides an output indicating a fail.

Thus, it is seen that the a test can be performed based on a transfer function between two portions of the sensor determined by actual data to determine if the sensing elements and the resulting pressure sensor is still functioning properly. Further, the test does not require running multiple tests at different pressures. Atmospheric pressure, especially at near sea level, is sufficient to perform the described test and obtain the comparison between what should be as compared to what is actually being obtained. Also instead of or in addition to simply providing a pass/fail decision, error detection 22 can provide information as to the degree to which the pressure sensor is providing erroneous pressure information.

By now it should be appreciated that there has been provided a method for testing a pressure sensor having a first node and a second node. The method includes coupling the first node to a first input of an amplifier and coupling a reference voltage to a second input of the amplifier. The method further includes applying a transfer function to an output of the amplifier to provide a first output voltage that is based on a difference in voltage between the first node and the reference voltage. The method further includes coupling the reference voltage to the first input of the amplifier and coupling the second node to the second input of the amplifier. The method further includes obtaining a second output voltage at the output of the amplifier. The method further includes determining, based on the first output voltage and the second output voltage, whether the pressure sensor passed or failed.

The method may have a further characterization in which the step of determining comprises comparing the first output voltage with the second output voltage to determine whether the pressure sensor passed or failed. The method may have a further characterization in which the step of determining comprises determining an error between the first output voltage and the second output voltage; and determining whether the pressure sensor passed or failed based on the error. The method may have a further characterization in which during normal operation, the method further comprises coupling the first node to a first input of an amplifier and the second node to a second input of the amplifier; and applying a second transfer function to the output of the amplifier to provide a third output voltage that is based on a difference in voltage between the first node and the second node of the pressure sensor. The method may further comprise characterizing the first node of the pressure sensor by coupling the first node to the first input of an amplifier and coupling the reference voltage to a second input of the amplifier and obtaining a first plurality of data points under different conditions; characterizing the second node of the pressure sensor by coupling the reference voltage to the first input of the amplifier and coupling the second node to the second input of the amplifier and obtaining a second plurality of data points under different conditions; determining the transfer function based on the first and second plurality of data points; and storing the transfer function. The method may have a further characterization in which the steps of coupling the first node, applying, coupling the reference voltage, obtaining, and determining are performed in response to a signal which indicates entry into a test mode of the pressure sensor.

Also described is a method for testing a pressure sensor having a first node and a second node. The method includes during normal operation, coupling the first node to a first input of an amplifier, the second node to a second input of the amplifier and applying a first transfer function to an output of the amplifier to provide a first output voltage that is based on a difference in voltage between the first node and the second node of the pressure sensor; and during a test mode: coupling the first node to the first input of the amplifier and coupling a reference voltage to the second input of the amplifier; applying a second transfer function to the output of the amplifier to provide a second output voltage that is based on a difference in voltage between the first node and the reference voltage; coupling the reference voltage to the first input of the amplifier and coupling the second node to the second input of the amplifier; obtaining a third output voltage at the output of the amplifier; determining an error between the second output voltage and the third output voltage; and determining whether the pressure sensor passed or failed based on the error. The method may further comprise receiving a test mode indicator to indicate when to enter the test mode. The method may further comprise characterizing the first node of the pressure sensor by coupling the first node to the first input of an amplifier and coupling the reference voltage to a second input of the amplifier and obtaining a first plurality of data points under different conditions; characterizing the second node of the pressure sensor by coupling the reference voltage to the first input of the amplifier and coupling the second node to the second input of the amplifier and obtaining a second plurality of data points under different conditions; determining the second transfer function based on the first and second plurality of data points; and storing the second transfer function. The method may further comprise characterizing the pressure sensor by coupling the first node to the first input of an amplifier and coupling the second node to the second input of the amplifier and obtaining a third plurality of data points under different conditions; determining the first transfer function based on the third plurality of data points; and storing the first transfer function.

Described also is a pressure sensing circuit. The pressure sensing circuit includes a pressure sensor having a first node and a second node. The pressure sensing circuit further includes an amplifier having a first input, a second input, and an output. The pressure sensing circuit further includes transfer function circuitry coupled to the output of the amplifier, wherein the transfer function circuitry applies a first transfer function to the output of the amplifier to provide a first output voltage. The pressure sensing circuit further includes control circuitry which, in response to a test mode indicator indicating entry into test mode: causes the first node of the pressure sensor to be coupled to the first input of the amplifier, a reference voltage to be coupled to the second input of the amplifier during, and the transfer function circuitry to apply the first transfer function to provide the first output voltage, and causes the reference voltage to be coupled to the first input of the amplifier and the second node of the pressure sensor to be coupled to the second input of the amplifier, wherein the output of the amplifier provides a second output voltage. The pressure sensing circuit further includes error detection circuitry, which, in response to the test mode indicator indicating entry into test mode, determines an error between the first output voltage and the second output voltage, and, based on the error, provides a pass/fail indicator which indicates whether the pressure sensor passes or fails. The pressure sensing circuit may have a further characterization in which the transfer function circuitry applies a second transfer function to the output of the amplifier to provide a third output voltage. The pressure sensing circuit may have a further characterization in which the control circuitry, in response to the test mode indicator indicating normal operation, causes the first node of the pressure sensor to be coupled to the first input of the amplifier, the second node of the pressure sensor to be coupled to the second input of the amplifier, and the transfer function circuitry to apply the second transfer function to provide the third output voltage. The pressure sensing circuit may further include storage circuitry coupled to the transfer function circuitry and the control circuitry which stores coefficients of the first transfer function and coefficients of the second transfer function. The pressure sensing circuit may have a further characterization in which the coefficients of the first transfer function and the coefficients of the second transfer function are determined and stored into the storage circuitry during manufacture of the pressure sensing circuit. The pressure sensing circuit may further include storage circuitry coupled to the transfer function circuitry and the control circuitry which stores coefficients of the first transfer function. The pressure sensing circuit may further include a first switch having a first terminal coupled to the first node, a second terminal coupled to a reference voltage, and a third terminal coupled to the first input of the amplifier, wherein the first switch, in response to a first switch control signal, either couples the first terminal to the third terminal or the second terminal to the third terminal; and a second switch having a first terminal coupled to the second node, a second terminal coupled to the reference voltage, and a third terminal coupled to the second input of the amplifier, wherein the second switch, in response to a second switch control signal, either couples the first terminal to the third terminal or the second terminal to the third terminal. The pressure sensing circuit may have a further characterization in which the control circuitry generates each of the first and second switch control signals in response to the test mode indicator. The pressure sensing circuit may have a further characterization in which the pressure sensor comprises a wheatstone bridge. The pressure sensing circuit may have a further characterization in which the wheatstone bridge comprises a first piezoelectric device coupled between a first voltage supply and the first node, a second piezoelectric device coupled between the first voltage supply and the second node, a third piezoelectric device coupled between the second node and a second voltage supply, and a fourth piezoelectric device coupled between the first node and the second voltage supply.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, the example described was for the case where the transfer function was based on the voltage at node SP undergoing the transfer function, but this could be reversed. In such case the result of the application of the transfer function would be from the voltage at node SM and would be compared to the Vraw derived from node SP. Accordingly, the specification and FIGURES are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method for testing a pressure sensor having a first node and a second node, the method comprising:
coupling the first node to a first input of an amplifier and coupling a reference voltage to a second input of the amplifier;
applying a transfer function to an output of the amplifier to provide a first output voltage that is based on a difference in voltage between the first node and the reference voltage;
coupling the reference voltage to the first input of the amplifier and coupling the second node to the second input of the amplifier;
obtaining a second output voltage at the output of the amplifier; and determining, based on the first output voltage and the second output voltage, whether the pressure sensor passed or failed.

2. The method of claim 1, wherein the step of determining comprises:
comparing the first output voltage with the second output voltage to determine whether the pressure sensor passed or failed.

3. The method of claim 1, wherein the step of determining comprises:
determining an error between the first output voltage and the second output voltage; and
determining whether the pressure sensor passed or failed based on the error.

4. The method of claim 1, wherein, during normal operation, the method further comprises:
coupling the first node to a first input of an amplifier and the second node to a second input of the amplifier; and
applying a second transfer function to the output of the amplifier to provide a third output voltage that is based on a difference in voltage between the first node and the second node of the pressure sensor.

5. The method of claim 1, further comprising:
characterizing the first node of the pressure sensor by coupling the first node to the first input of an amplifier and coupling the reference voltage to a second input of the amplifier and obtaining a first plurality of data points under different conditions;
characterizing the second node of the pressure sensor by coupling the reference voltage to the first input of the amplifier and coupling the second node to the second input of the amplifier and obtaining a second plurality of data points under different conditions;
determining the transfer function based on the first and second plurality of data points; and
storing the transfer function.

6. The method of claim 1, wherein the steps of coupling the first node, applying, coupling the reference voltage, obtaining, and determining are performed in response to a signal which indicates entry into a test mode of the pressure sensor.

7. A method for testing a pressure sensor having a first node and a second node, the method comprising:
during normal operation, coupling the first node to a first input of an amplifier, the second node to a second input of the amplifier and applying a first transfer function to an output of the amplifier to provide a first output voltage that is based on a difference in voltage between the first node and the second node of the pressure sensor; and
during a test mode:
coupling the first node to the first input of the amplifier and coupling a reference voltage to the second input of the amplifier;
applying a second transfer function to the output of the amplifier to provide a second output voltage that is based on a difference in voltage between the first node and the reference voltage;
coupling the reference voltage to the first input of the amplifier and coupling the second node to the second input of the amplifier;
obtaining a third output voltage at the output of the amplifier;
determining an error between the second output voltage and the third output voltage; and
determining whether the pressure sensor passed or failed based on the error.

8. The method of claim 7, further comprising:
receiving a test mode indicator to indicate when to enter the test mode.

9. The method of claim 7, further comprising:
characterizing the first node of the pressure sensor by coupling the first node to the first input of an amplifier and coupling the reference voltage to a second input of the amplifier and obtaining a first plurality of data points under different conditions;
characterizing the second node of the pressure sensor by coupling the reference voltage to the first input of the amplifier and coupling the second node to the second input of the amplifier and obtaining a second plurality of data points under different conditions;
determining the second transfer function based on the first and second plurality of data points; and
storing the second transfer function.

10. The method of claim 9, further comprising:
characterizing the pressure sensor by coupling the first node to the first input of an amplifier and coupling the second node to the second input of the amplifier and obtaining a third plurality of data points under different conditions;
determining the first transfer function based on the third plurality of data points; and
storing the first transfer function.

* * * * *